(12) United States Patent
Cheung

(10) Patent No.: US 11,873,104 B2
(45) Date of Patent: Jan. 16, 2024

(54) PASSENGER SEAT WITH VARIABLE LIVING SPACE

(71) Applicant: Safran Seats USA LLC, Gainesville, TX (US)

(72) Inventor: Tak Fu Cheung, Everett, WA (US)

(73) Assignee: Safran Seats USA LLC, Gainesville, TX (US)

(*) Notice: Subject to any disclaimer, the term of this patent is extended or adjusted under 35 U.S.C. 154(b) by 1259 days.

(21) Appl. No.: 16/467,328

(22) PCT Filed: Dec. 6, 2017

(86) PCT No.: PCT/US2017/064844
§ 371 (c)(1),
(2) Date: Jun. 6, 2019

(87) PCT Pub. No.: WO2018/106767
PCT Pub. Date: Jun. 14, 2018

(65) Prior Publication Data
US 2020/0086995 A1    Mar. 19, 2020

Related U.S. Application Data

(60) Provisional application No. 62/431,058, filed on Dec. 7, 2016.

(51) Int. Cl.
*B64D 11/06* (2006.01)
*B60N 2/30* (2006.01)
(Continued)

(52) U.S. Cl.
CPC .......... *B64D 11/0648* (2014.12); *B60N 2/045* (2013.01); *B64D 11/0639* (2014.12)
(Continued)

(58) Field of Classification Search
CPC ........ B60N 2/045; B60N 2/1615; B60N 2/12; B60N 2/3065; B60N 2/309; B64D 11/0648; B64D 11/0639; B64D 11/0601
See application file for complete search history.

(56) References Cited

U.S. PATENT DOCUMENTS 2,345,182 A    3/1944 Corber
3,860,283 A    1/1975 Colautti
(Continued)

FOREIGN PATENT DOCUMENTS

CN    103781659 A    5/2014
CN    104487284 A    4/2015
(Continued)

OTHER PUBLICATIONS

China Patent Application No. 2017800758139, Notice of Allowance, dated Jan. 20, 2023.
(Continued)

*Primary Examiner* — Shin H Kim
(74) *Attorney, Agent, or Firm* — Kilpatrick Townsend & Stockton LLP

(57) ABSTRACT

A leg assembly for a passenger seat includes a base member (102), a leg (104B), and an adjuster (106). The leg includes an upper end (110) and a lower end (112). The upper end of the leg includes an aperture (126) configured to receive a base frame tube, and the lower end is pivotally connected to the base member such that the leg is pivotable forward and aft from a base position. The adjuster is configured to pivotally position the leg relative to the base member.

18 Claims, 11 Drawing Sheets

(51) Int. Cl.
*B60N 2/12* (2006.01)
*B60N 2/04* (2006.01)

(56) References Cited

U.S. PATENT DOCUMENTS

| | | | | |
|---|---|---|---|---|
| 8,764,111 | B2* | 7/2014 | Foelster | B60N 2/1615 |
| | | | | 297/344.17 |
| 9,108,538 | B2* | 8/2015 | Becker | B60N 2/045 |
| 9,656,753 | B2* | 5/2017 | Schomacker | B64D 11/0648 |
| 10,710,727 | B2* | 7/2020 | Gross | B64D 11/0696 |
| 11,027,847 | B2* | 6/2021 | Itzinger | B60N 2/3093 |
| 2004/0066073 | A1* | 4/2004 | Wagner | B64D 11/0648 |
| | | | | 297/337 |
| 2010/0253129 | A1 | 10/2010 | Dowty et al. | |
| 2011/0042514 | A1 | 2/2011 | Ehlers et al. | |
| 2012/0248840 | A1 | 10/2012 | Becker et al. | |
| 2013/0099538 | A1 | 4/2013 | Jussli et al. | |
| 2014/0306060 | A1* | 10/2014 | Schomacker | B64D 11/0601 |
| | | | | 244/118.6 |
| 2014/0306061 | A1* | 10/2014 | Schomacker | B60N 2/3065 |
| | | | | 297/331 |
| 2019/0092476 | A1* | 3/2019 | Gross | B64D 11/0696 |
| 2020/0086995 | A1* | 3/2020 | Cheung | B64D 11/0648 |
| 2020/0247546 | A1* | 8/2020 | Wong | B64D 11/0647 |
| 2020/0339264 | A1* | 10/2020 | Baldomero | B64D 11/0619 |
| 2021/0206495 | A1* | 7/2021 | Murnan | B64D 11/0648 |
| 2022/0227263 | A1* | 7/2022 | Ward | B60N 2/0862 |

FOREIGN PATENT DOCUMENTS

| | | |
|---|---|---|
| CN | 105658520 A | 6/2016 |
| EP | 3551536 B1 | 6/2021 |
| GB | 515788 | 12/1939 |
| WO | 2013109751 | 7/2013 |

OTHER PUBLICATIONS

China Patent Application No. 2017800758139, Office Action, dated Aug. 17, 2022.
International Patent Application No. PCT/US2017/064844, Search Report and Written Opinion, dated Mar. 12, 2018.
Europe Patent Application No. 17823267.4, Communication pursuant to Rule 71(3) EPC (allowance), dated Jan. 15, 2021.
Europe Patent Application No. 17823267.4, Decision to grant a European patent pursuant to Article 97(1) EPC, dated May 28, 2021.

* cited by examiner

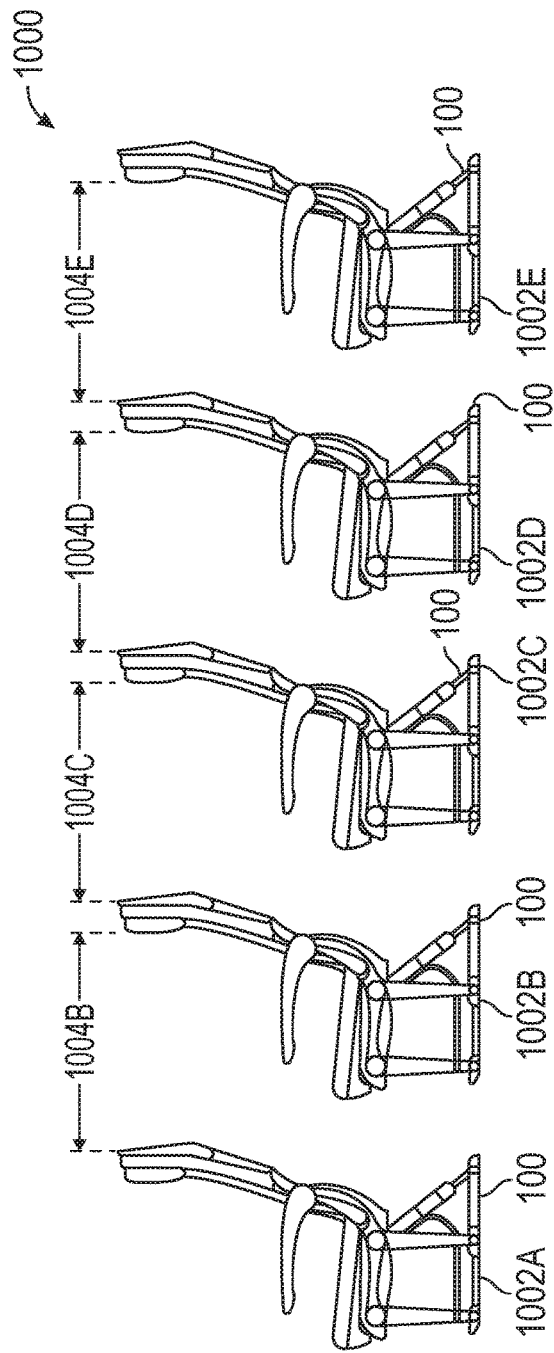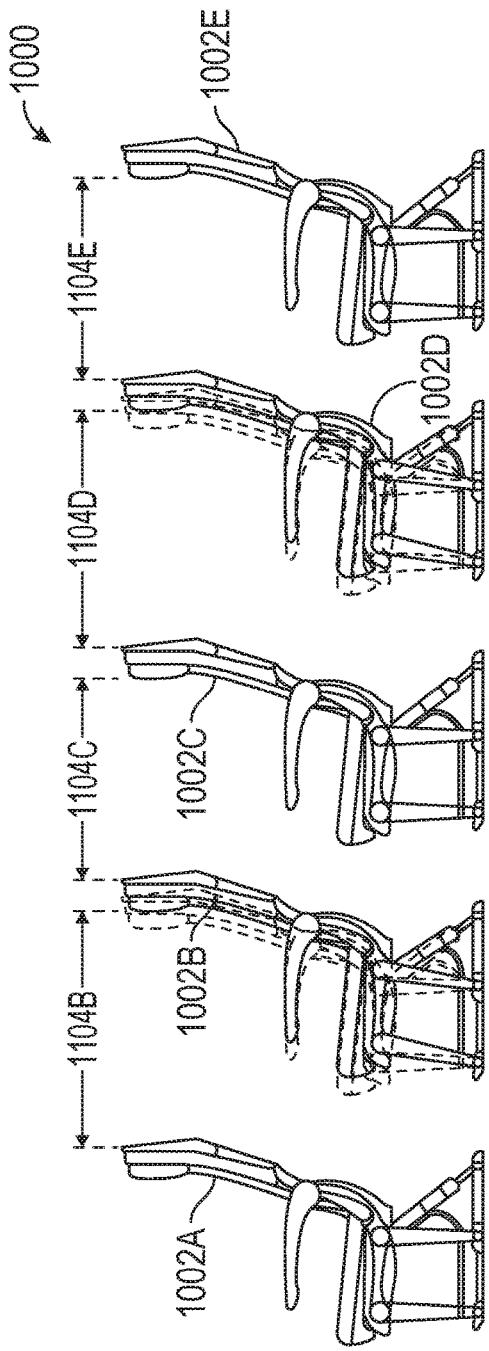

PASSENGER SEAT WITH VARIABLE LIVING SPACE

REFERENCE TO RELATED APPLICATIONS

This application claims the benefit of U.S. Provisional Application No. 62/431,058, filed Dec. 7, 2016 and entitled VARIABLE LIVING SPACE AIRCRAFT PASSENGER SEAT, the content of which is hereby incorporated by reference in its entirety.

FIELD OF THE INVENTION

This application relates to passenger seats, and more particularly to passenger seats with variable living space.

BACKGROUND

Passenger vehicles, such as aircraft, buses, trains, ships, and automobiles, include passenger seats for passengers to sit in and utilize during travel. Sometimes, passenger seats are subdivided into classes based on the amount of living space offered by the particular seat. For example, in recent years, some airlines have offered premium economy seats in addition to regular economy seats. The premium economy seats offer the same seat as regular economy seats along with extra leg room (typically 2-4 inches). However, the availability of premium economy seats is solely based on the fixed seat configuration at that time. Some airlines are only able to label their typical fire exit row seats as premium because re-pitching of the seats requires much engineering and certification cost. Moreover, while some passengers are willing to pay a premium for extra living space, other passengers only want to pay for the most economical way to travel. As such, the demand for economy or premium economy seats varies with customer needs, flight routes, locations served, and many other factors, but a fixed configuration of passenger seats can only address these changes to a certain extent. Therefore, there is a need for a passenger seat that allows for airlines (or other vehicle operators) to vary the amount of living space that is sold to certain types of passengers for certain types of seats.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to various examples, a leg assembly for a passenger seat includes a base member, a leg, and an adjuster. The leg includes an upper end and a lower end, where the upper end of the leg comprises an aperture configured to receive a base frame tube, and where the lower end is pivotally connected to the base member such that the leg is pivotable forward and aft from a base position. The adjuster is configured to pivotally position the leg relative to the base member.

In some examples, the base position is a vertical position, and the leg is pivotable forward and aft from greater than 0° to about 15° from the base position. In certain aspects, the leg is an aft leg and the adjuster is connected to the base member and the aft leg, and the leg assembly further includes a forward leg having an upper end and a lower end. In various cases, the forward leg is pivotally connected to the base member such that the leg is pivotable forward and aft from a base position.

In certain aspects, the adjuster is a manually adjustable and is configured to pivotally position the leg between preset positions. According to some cases, the adjuster includes a first threaded rod having a clockwise thread and a first alignment hole and a second threaded rod having a counter-clockwise thread and a second alignment hole. In various examples, the adjuster includes a sleeve rotatably positioned on the first threaded rod and the second threaded rod and including a sleeve alignment holes, and a locking washer positioned on the first threaded rod or the second threaded rod. In some examples, the locking washer defines a first preset position, a distance between an end of the first threaded rod and an end of the second threaded rod is adjustable through rotation of the sleeve, and the sleeve alignment hole is aligned with the first alignment hole or the second alignment hole in a second preset position. According to certain cases, the adjuster is automatically adjustable, and the adjuster is configured to pivotally position the leg between preset positions.

In various examples, the upper end of the leg further includes a stopping slot with a forward end and an aft end, and the stopping slot extends transversely to the aperture. In certain cases, the leg assembly further includes a bearing rotatably positioned within the aperture. In various cases, the bearing includes an inner surface configured to interface with the base frame tube, an outer surface interfaced with an aperture surface of the aperture such that the leg assembly is rotatable relative to the bearing, a stopping extension positioned within the stopping slot, and a fastener configured to secure the base frame tube to the bearing. According to certain examples, the stopping extension includes a forward end and an aft end, the forward end of the stopping extension is configured to interface with the forward end of the stopping slot in an aft-most position of the leg, the aft end of the stopping extension is configured to interface with the aft end of the stopping slot in a forward-most position of the leg, and the fastener extends transversely through the aperture and is connected to the forward end and the aft end of the stopping extension.

According to some examples, a passenger seat includes the leg assembly. In certain cases, the passenger seat further includes a backrest and a seat base including the base frame tube.

According to certain examples, a passenger seat includes a seat base and a leg assembly supporting the seat base. In some cases, the leg assembly includes a base member, a leg with an upper end and a lower end, where the lower end is pivotally connected to the base member such that the leg is pivotable forward and aft from a base position, and an adjuster configured to pivotally position the leg relative to the base member. In various aspects, the leg assembly is configured to adjust a living space of the passenger seat by pivotally positioning the leg relative to the base member.

In some aspects, the base position is a vertical position, and the leg is pivotable forward and aft from greater than 0° to about 15° from the base position. In some cases, the leg is an aft leg and the adjuster is connected to the base member and the aft leg, and the leg assembly further includes a forward leg including an upper end and a lower end, where the forward leg is pivotally connected to the base member such that the leg is pivotable forward and aft from a base position.

In various cases, the upper end of the leg further includes an aperture and a stopping slot with a forward end and an aft end, where the stopping slot extends transversely to the aperture, and where a base frame tube of the seat base is positioned within the aperture. In certain examples, a bearing is rotatably positioned within the aperture and includes: an inner surface interfaced with the base frame tube; an outer surface interfaced with an aperture surface of the aperture such that the leg assembly is rotatable relative to the bearing; a stopping extension positioned within the stopping slot; and a fastener configured to secure the base frame tube to the bearing. In some cases, the stopping extension comprises a forward end and an aft end, the forward end of the stopping extension is configured to interface with the forward end of the stopping slot in a forward-most position of the leg, the aft end of the stopping extension is configured to interface with the aft end of the stopping slot in an aft-most position of the leg, the fastener extends transversely through the aperture, and the fastener is connected to the forward end and the aft end of the stopping extension.

According to various examples, a method of controlling a passenger seat arrangement includes: determining a desired living space of a passenger seat of the passenger seat arrangement; determining an actual living space of the passenger seat; and controlling the passenger seat such that the actual living space is the desired living space. In certain cases, controlling the passenger seat includes controlling an adjuster of a leg assembly and pivoting a leg of the leg assembly of the passenger seat relative to a base member of the leg assembly.

In some aspects, controlling the passenger seat includes pivoting the leg of the leg assembly in a forward direction. In various cases, controlling the passenger seat includes pivoting the leg of the leg assembly in and aft direction. In certain examples, controlling the passenger seat includes pivoting the leg of the leg assembly relative to a base position of the leg. According to some examples, the base position is vertical, and controlling the passenger seat includes pivoting the leg of the leg assembly such that the actual living space is changed up to a predetermined amount in a forward direction or an aft direction from relative to the base position.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 10 is a side view of a passenger seat arrangement where two passenger seats include the leg assembly of FIG. 1, and where the leg assemblies are in the base position, FIG. 11 is a side vie the passenger seat arrangement of FIG. 10 with the leg assemblies in a preset position.

DETAILED DESCRIPTION

Figure 1:
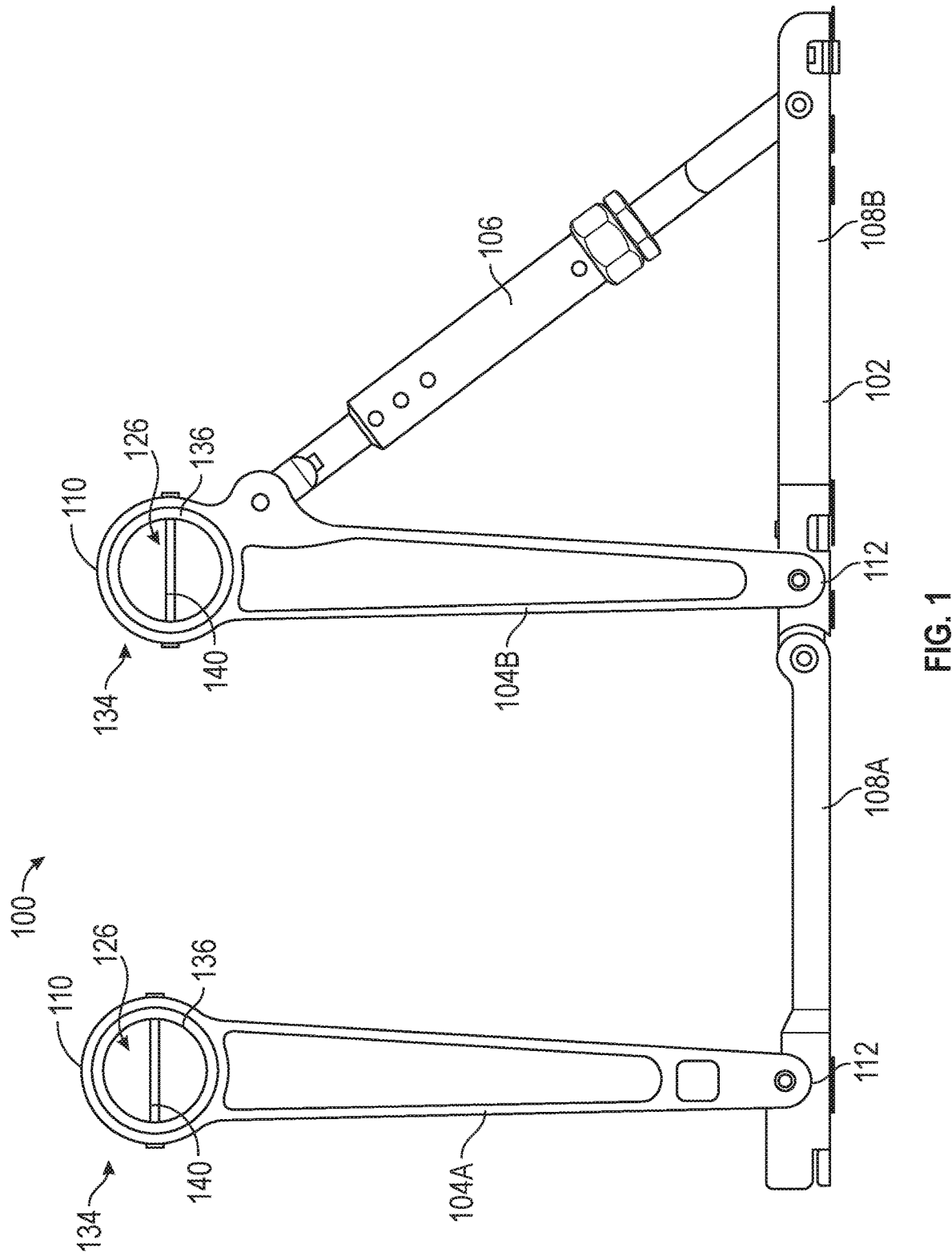
FIG. 1 is a side view of a leg assembly for a passenger seat according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "top," "left," "right," "front," and "back," among others are intended to refer to the orientation as illustrated and described in the figure (or figures) to which the components and directions are referencing.

In one aspect, disclosed is a leg assembly for a passenger seat, such as an aircraft passenger seat, and associated methods, systems, devices, and various apparatus. The leg assembly includes a leg and a base. The leg is pivotally connected to the base such that the leg is pivotable forward and aft from a base position. It would be understood by one of skill in the art that the disclosed amenities panel is described in but a few exemplary aspects among many, The leg assembly is configured to support a passenger seat, such as a seat base and a backrest. In some examples, the leg assembly is configured to support at least one base frame tube of the passenger seat. In various examples, the leg assembly is pivotable such that a living space of the passenger seat may be adjusted quickly to match seat arrangement needs at a period of time without requiring further engineering or additional certification.

FIGS. 1-4 illustrate an example of a leg assembly 100. The leg assembly 100 includes a base member 102, at least one leg 104, and an adjuster 106. In various examples, the leg assembly 100 includes a forward leg 104A and an aft leg 104B.

The base member 102 is configured to secure the leg assembly 100 (and supported passenger seat assembly) to the floor of a vehicle, such as a cabin floor of an aircraft or other suitable vehicle. In some examples, the base member 102 includes track fittings to couple and secure the leg assembly 100 to a track mounted to the floor of the vehicle. Optionally, the base member 102 may include a plurality base segments 108A-B coupled together (e.g., pivotally coupled together or through various other suitable coupling mechanisms), although it need not. For example, in other cases, a single base segment 108 may be provided. The number of base segments 108 should not be considered limiting on the current disclosure.

The forward leg 104A and aft leg 104B each include an upper end 110 and a lower end 112. Each leg 104A-B may be formed of aluminum, stainless steel, other metallic materials, composite materials, or other similar materials.

Figure 4:
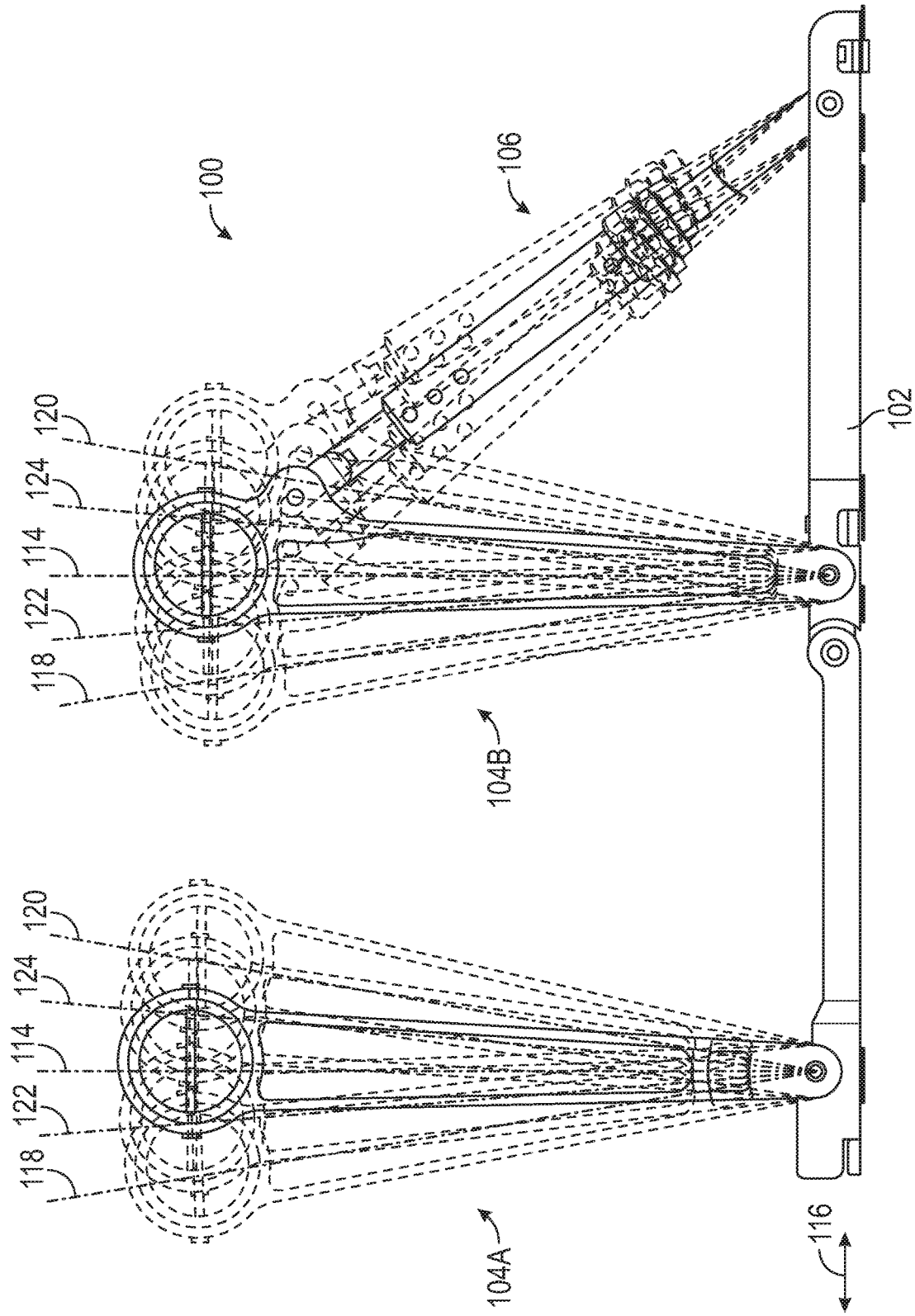
FIG. 4 is a side view of the leg assembly of FIG. 1 illustrating a range of pivoting of the leg assembly.

The lower end 112 is pivotally connected to the base member 102 such that the forward leg 104A and aft leg 104B are each pivotable forward and aft from a base position 114 (see FIG. 4). It is noted that the position of the lower end 112 of each leg 104A-B remains at a fixed position relative to the base member 102 (and optionally relative to a surface on which the leg assembly 100 is mounted) when the legs 104A-B pivot forward and/or aft from the base position 114. As described in detail below, by maintaining the lower ends 112 at fixed positions, an operator of a passenger seat with the leg assembly 100 can adjust the leg assembly 100 to adjust a living space of the passenger seat without requiring re-engineering or recertification of the passenger seat.

Referring to FIG. 4, in certain examples, the base position 114 of each leg 104A-B is perpendicular to a horizontal axis 116. Each leg 104A-B is pivotable between a forward-most position 118 and an aft-most position 120. As described in detail below, pivoting the legs 104A-B to the aft-most position 120 may increase the living space of the passenger seat, and pivoting the legs 104A-B to the forward-most position 118 may decrease the living space of the passenger seat. In certain aspects, and as described in detail below, the adjuster 106 is configured to pivotally position the legs 104A-B at various desired positions between the forward-most position 118 and the aft-most position 120.

In certain examples, an angle between the base position 114 and the forward-most position 118 and/or the base position 114 and the aft-most position 120 is from greater than 0° to about 20°, such as from greater than 0° to about 15°. For example, in some non-limiting examples, the angle between the base position 114 and the forward-most position 118 or the aft-most position 120 may be about 10°, about 11°, about 12°, about 13°, about 14°, or about 15°. In some examples, pivoting the legs 104A-B adjusts the living space of the passenger seat from the base position 114 forward or aft by greater than 0 inches to about 3.5 inches, such as from greater than 0 inches to about 3.0 inches, such as from greater than 0 inches to about 2.5 inches, such as from greater than 0 inches to about 2.0 inches. In other words, the living space of the passenger seat may be adjusted up to about +/−3.5 inches, such as up to about +/−3.0 inches, such as up to about +/−2.5 inches, such as up to about +/−2.0 inches. In some examples, the angle between the base position 114 and the forward-most position 118 (or the corresponding change in living space) is the same as the angle between the base position 114 and the aft-most position 120 (or the corresponding change in living space), although it need not be.

In various cases, in addition to being pivotable to the forward-most position 118 and the aft-most position 120, the legs 104A-B are also pivotable to an intermediate forward position 122 and an intermediate aft position 124. The number or location of the intermediate forward positions 122 or intermediate aft positions 124 should not be considered limiting on the current disclosure. In some examples, the intermediate forward position 122 may be about halfway between the base position 114 and the forward-most position 118, although it need not be. Likewise, the intermediate aft position 124 may be about halfway between the base position 114 and the aft-most position 120, although it need not be.

In certain examples, a passenger seat having the leg assembly 100 have a maximum height (or distance from a surface on which the passenger seat is mounted to a top of the seat back) when the leg assembly 100 is in the base position 114 and may have a minimum height in the forward-most position 118 and/or the aft-most position 120. In some non-limiting cases, a maximum difference between the minimum height and the maximum height is less than about 1.0 inch, such as less than about 0.8 inches, such as less than about 0.6 inches, such as less than about 0.4 inches, such as less than about 0.2 inches. In one non-limiting example, the maximum difference between the minimum height and the maximum height is from about 0 inches to about 0.2 inches.

Figure 2:
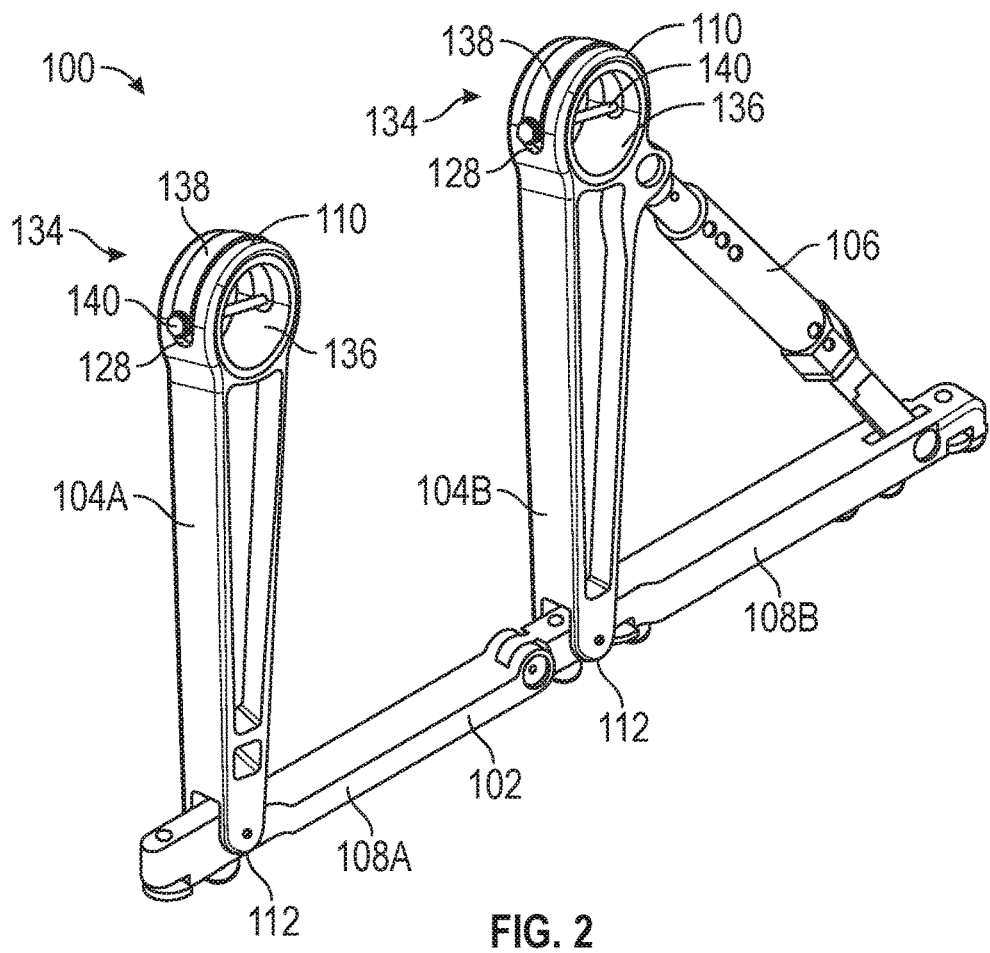
FIG. 2 is a perspective view of the leg assembly of FIG. 1.
Figure 3:
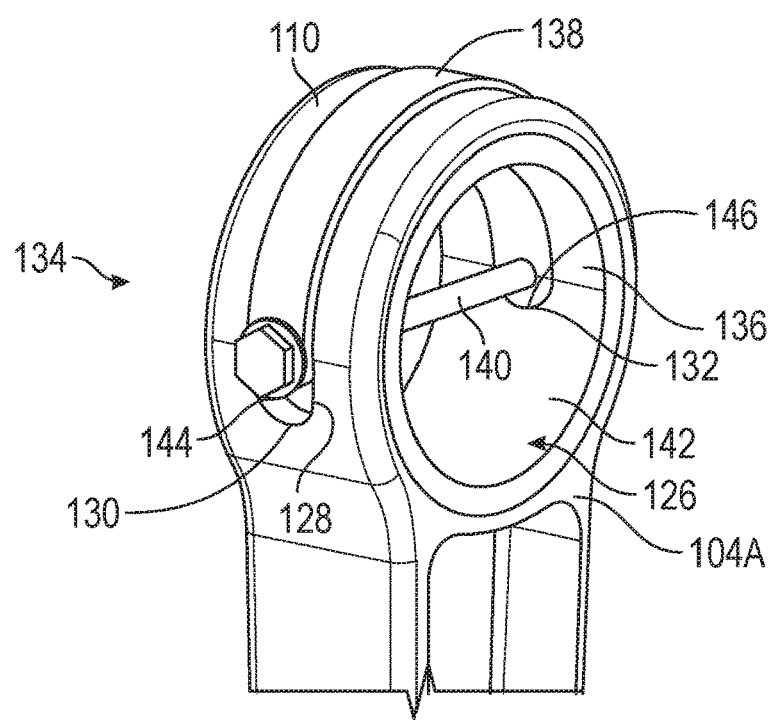
FIG. 3 is an enlarged perspective view of a portion of a leg of the leg assembly of FIG. 1.

As illustrated in FIGS. 1-3, the upper end 110 of each leg 104A-B includes an aperture 126. The aperture 126 receives a base frame tube (not shown) of the passenger seat (e.g., a base of the passenger seat) to couple the leg assembly 100 to the passenger seat such that the leg assembly 100 supports the passenger seat in a vehicle (see, e.g., FIGS. 5-7 and 9). In some examples and as illustrated in FIGS. 2 and 3, the upper end 110 also includes a stopping slot 128 having a forward end 130 and an aft end 132. In certain cases, the stopping slot 128 extends transversely to the aperture 126 (see FIG. 3).

In some examples, a bearing assembly 134 is provided with the upper end 110 that connects the base frame tube to the corresponding leg 104A-B while allowing for rotation and/or pivoting of the leg 104A-B relative to the base frame tube. In certain examples, the bearing assembly 134 includes a bearing 136, a stopping extension 138, and a connector 140.

The bearing 136 includes an outer surface (not shown) and an inner surface 142. The bearing 136 is positioned in the aperture 126 such that the outer surface interfaces with an aperture surface (not shown) of the aperture 126 such that the leg 104A-B is movable relative to the bearing 136. In certain examples, the inner surface 142 defines an opening that is configured to receive the base frame tube such that the base frame tube interfaces with the inner surface 142. In some cases, the connector 140 couples the base frame tube to the bearing 136 such that the base frame tube is at a fixed position relative to the bearing 136 and the leg 104A-B can pivot or rotate relative to the base frame tube. In various cases, the connector 140 is a fastener, such as nut and bolt, although various other suitable connectors may be utilized. As illustrated in FIG. 1, in some cases, the connector 140 extends transversely through the aperture 126. In various aspects, the connector 140 is connected to a forward end 144 and an aft end 146 of the stopping extension 138, although it need not.

The stopping extension 138 is positioned within the stopping slot 128 and includes the forward end 144 and the aft end 146. In certain cases, the stopping extension 138 limits side-to-side motion. In various examples, the stopping extension 138 also limits forward and aft movement of the leg 104A-B relative to the bearing 136 (and base frame tube). In some cases, the forward end 144 interfaces with the forward end 130 of the stopping slot 128 when the leg 104A-B is in the aft-most position 120 and the aft end 146 interfaces with the aft end 132 of the stopping slot 128 when the leg 104A-B is in the forward-most position 118 (see, e.g., FIG. 3). In various aspects, the forward end 144 is spaced apart from the forward end 130 of the stopping slot 128 when the leg 104A-B is in the forward-most position 118 (see, e.g., FIG. 3) and the aft end 146 is spaced apart from the aft end 132 of the stopping slot 128 when the leg 104A-B is in the aft-most position 120.

Referring to FIGS. 1, 2, and 4, the adjuster 106 is coupled to the base member 102 and the aft leg 104B and is configured to pivotally position the aft leg 104B with respect to the base position 114. In certain examples, the adjuster 106 is pivotally coupled to both the base member 102 and the aft leg 104B, although various other coupling mechanisms may be utilized. In various cases, the forward leg 104A is indirectly coupled to the adjuster 106 (e.g., through a seat base of a passenger seat) such that the adjuster 106 pivotally positions both the forward leg 104A and the aft leg 104B. In various cases, the adjuster 106 positions the legs 104A-B such that the legs 104A-B are at the forward-most position 118, aft-most position 120, base position 114, intermediate forward position 122, or intermediate aft position 124 (collectively "preset positions"). As described previously, the legs 104A-B may have any desired number of preset positions. In some non-limiting examples, the legs 104A-B each have five preset positions, although in other examples, the legs 104A-B may have less than five preset positions or more than five preset positions. In some examples, the adjuster 106 is also a load-limiting strut that is configured to absorb energy when the passenger seat with the leg assembly 100 pitches forward during a crash.

In certain cases, the adjuster 106 positions the aft leg 104B by elongating or shortening an overall length of the adjuster 106. In other examples, various other mechanisms for pivotally positioning the aft leg 104B may be utilized In some examples, the adjuster 106 is manually adjustable. In other examples, the adjuster 106 is automatically adjustable through various suitable adjustment mechanisms (e.g., electrically, pneumatically, hydraulically, etc.).

FIGS. 5A-E illustrate a non-limiting example of a manually adjustable adjuster 106. As illustrated in FIGS. 5A-E, in some cases, the adjuster 106 includes a first rod 502 and a second rod 504. The first rod 502 includes a first end 506 and a second end 508 opposite the first end 506. Similarly, the second rod 504 includes a first end 510 and a second end 512. In certain examples, the first end 506 of the first rod 502 is configured to be coupled to one of the aft leg 104B or the base member 102, and the second end 512 of the second rod 504 is configured to be coupled to the other of the aft leg 104B or the base member 102. An overall length of the adjuster 106 is a distance from the first end 506 to the second end 512.

As illustrated in FIGS. 5A-E, in some examples, a sleeve 518 covers portions of both the first rod 502 and the second rod 504. In certain examples, the sleeve 518 is threadably engaged with the first rod 502 and the second rod 504 such that rotation of the sleeve 518 relative to rods 502, 504 elongates or shortens the overall length of the adjuster 106. In some optional examples, the first rod 502 includes threads in a first direction (e.g., clockwise) and the second rod 504 includes threads in a second direction (e.g., counterclockwise) such that rotation of the sleeve 518 elongates or shortens the overall length of the adjuster 106.

Figure 5A:
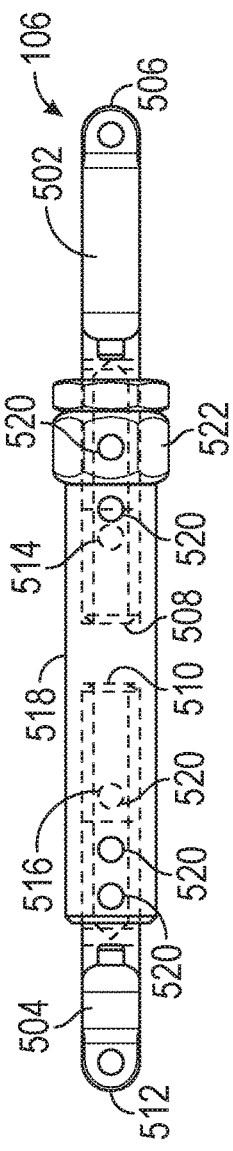
FIGS. 5A-E are side views of an adjuster for a leg assembly in various preset positions.
Figure 5B:
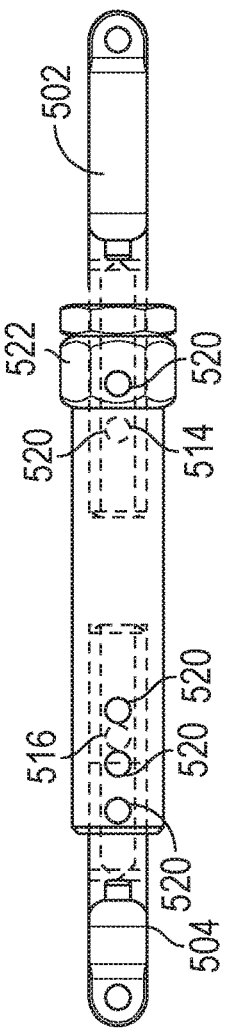
Figure 5C:
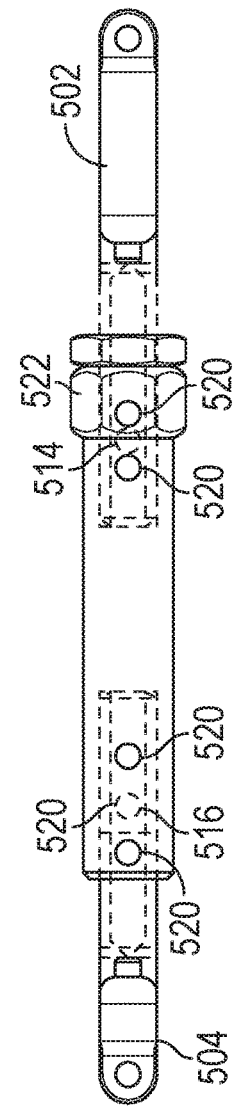
Figure 5D:
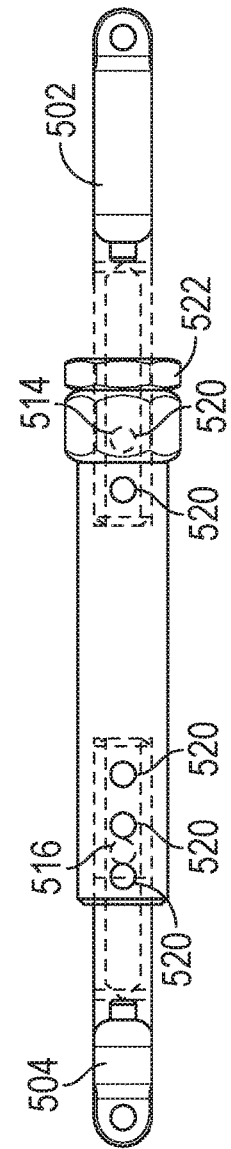
Figure 5E:
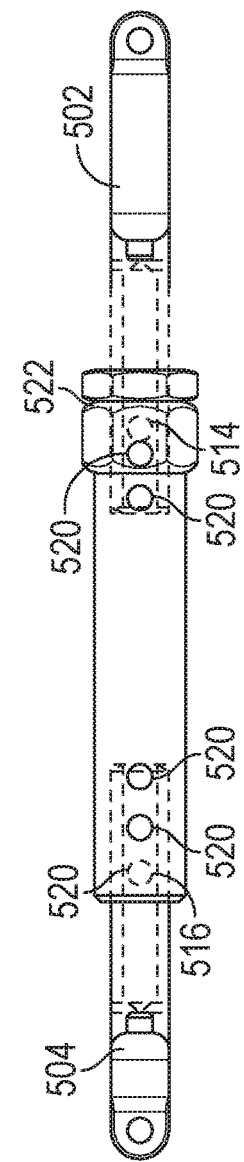

In certain cases, the first rod 502 includes at least one preset position indicator 514. Similarly, the second rod 504 includes at least one preset position indicator 516. In some cases, the sleeve 518 includes at least one sleeve preset position indicator 520. Optionally, the preset position indicators 514, 516, 520 are alignment holes, although other preset position indicators may be utilized. In some cases, the alignment of the sleeve preset position indicator 520 with one (or both) of the preset position indicators 514, 516 provides an indication to the operator that the leg assembly 100 is in one of the preset positions (e.g., forward-most position 118, aft-most position 120, base position 114, intermediate forward position 122, intermediate aft position 124, etc.). In one non-limiting example, FIG. 5A illustrates a configuration of the adjuster 106 to position the leg assembly 100 in the aft-most position 120, FIG. 5B illustrates a configuration of the adjuster 106 to position the leg assembly 100 in the intermediate aft position 124, FIG. 5C illustrates a configuration of the adjuster 106 to position the leg assembly 100 in the base position 114, FIG. 5D illustrates a configuration of the adjuster 106 to position the leg assembly 100 in the intermediate forward position 122, and FIG. 5E illustrates a configuration of the adjuster 106 to position the leg assembly in the forward-most position 118. In these examples, the overall length of the adjuster 106 in FIG. 5E is greater than the overall length of the adjuster 106 in FIG. 5D, which is greater than the overall length of the adjuster 106 in FIG. 5C. The overall length of the adjuster 106 in FIG. 5C is greater than the overall length of the adjuster 106 in FIG. 5B, which is greater than the overall length of the adjuster in FIG. 5A.

Optionally, a locking washer 522 (or other suitable locking mechanism) is provided on the first rod 502 or the second rod 504. In various cases, the locking washer 522 may aid in maintaining the positioning of the rods 502, 504 and sleeve 518 when the adjuster 106 is at the desired preset position.

Figure 6:
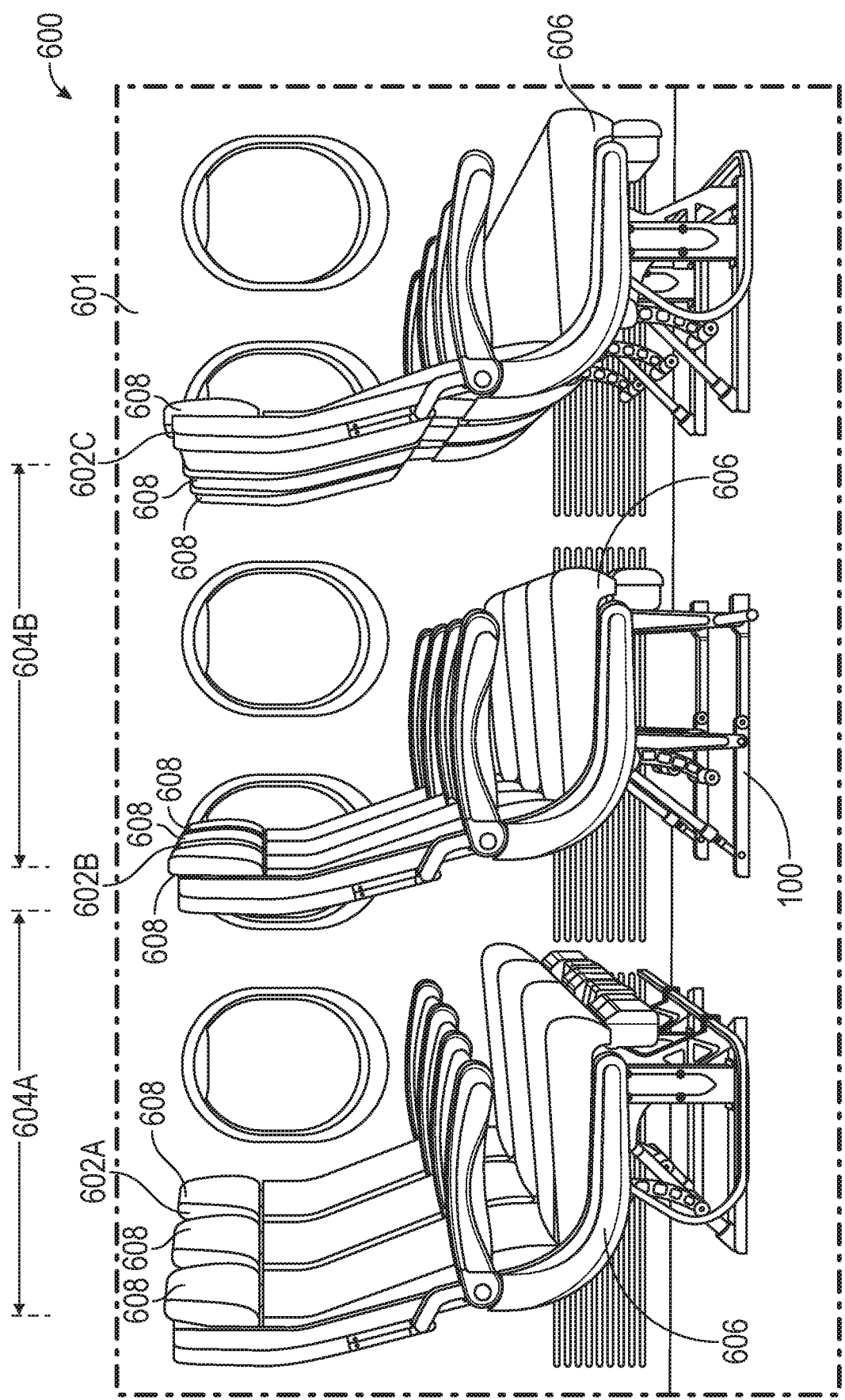
FIG. 6 is a perspective view of a passenger seat arrangement where one passenger seat includes the leg assembly of FIG. 1, and the leg assembly is in a base position.
Figure 7:
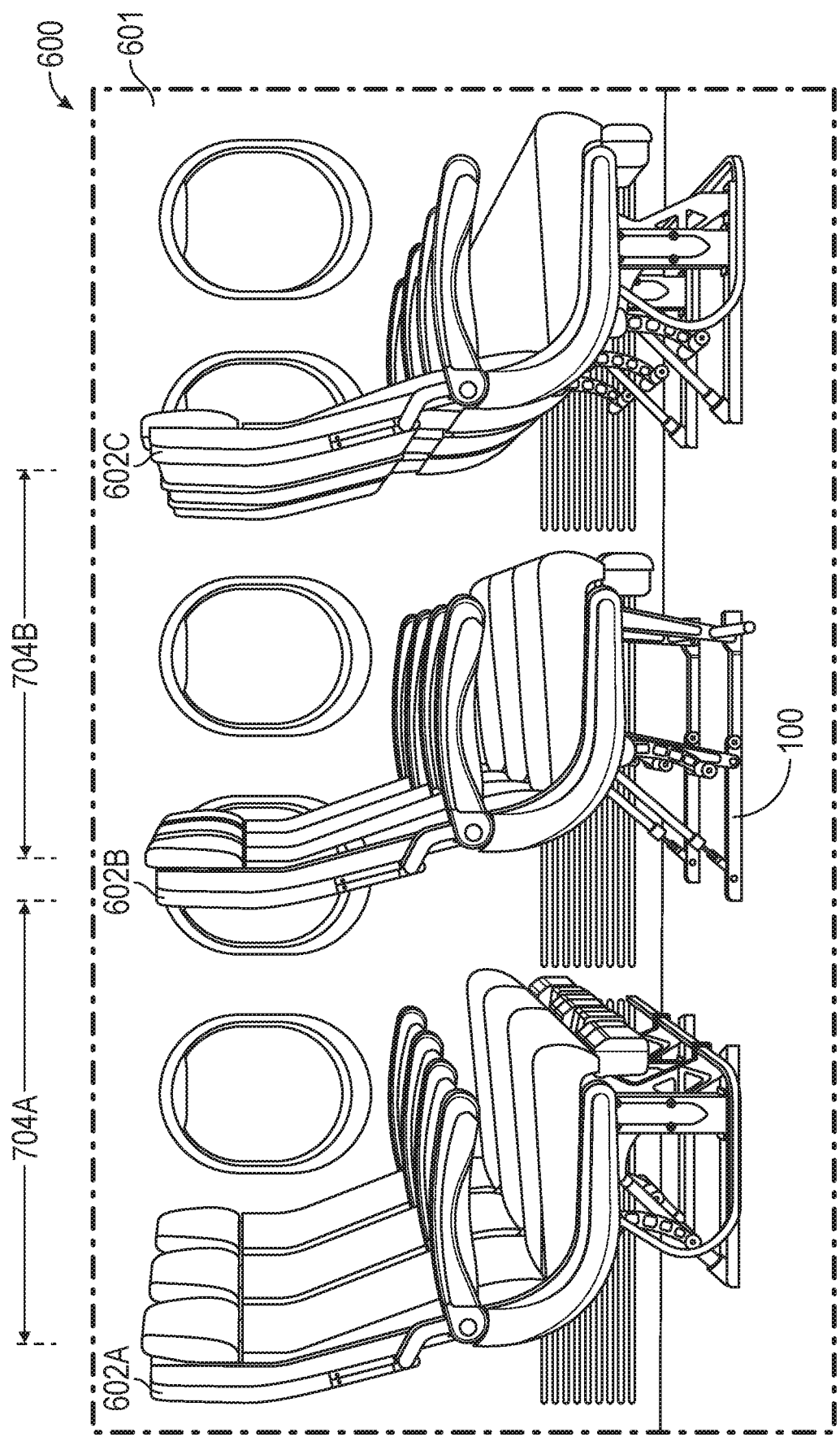
FIG. 7 is a perspective view of the passenger seat arrangement of FIG. 6 with the leg assembly in a forward position.
Figure 8:
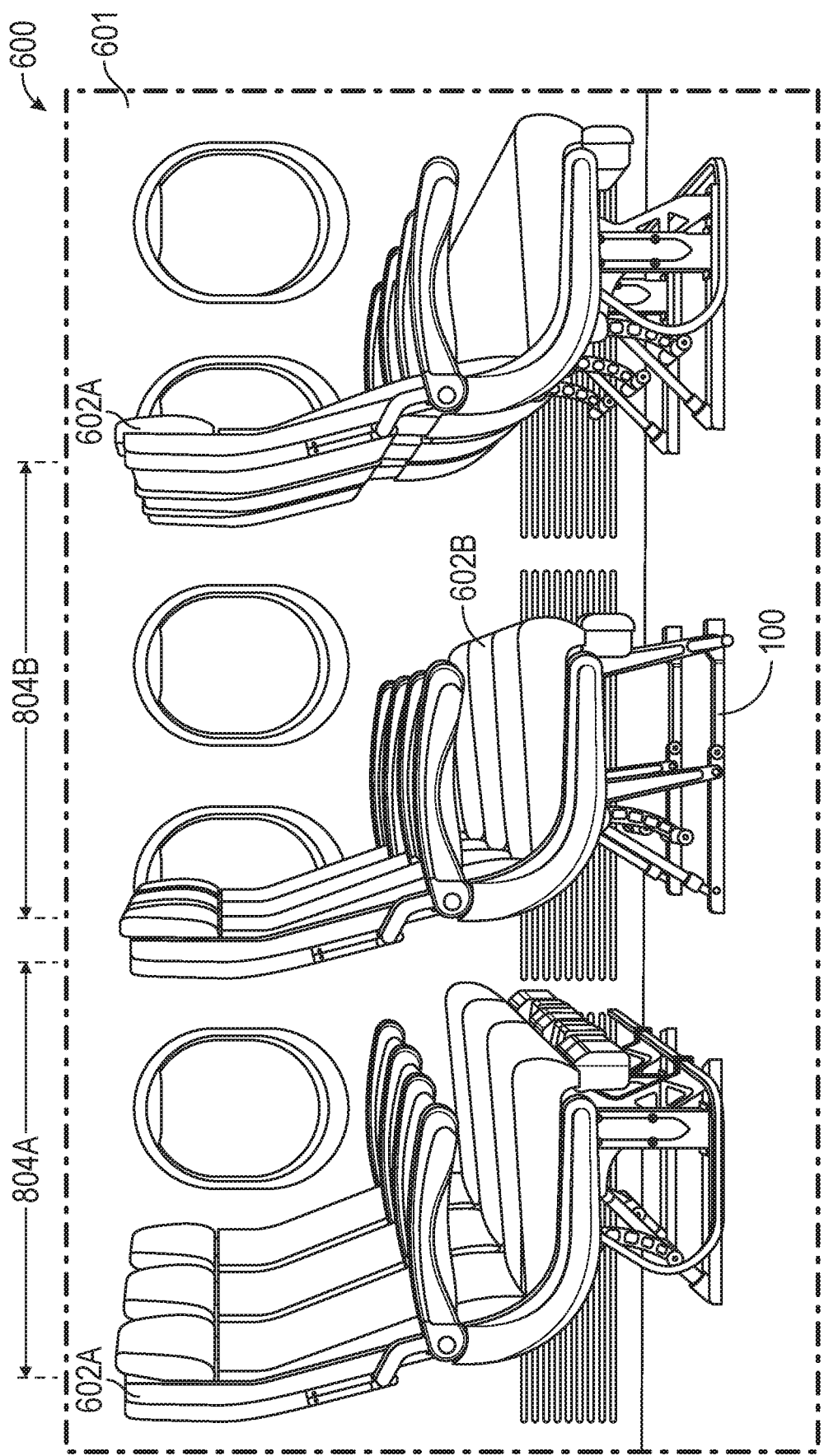
FIG. 8 is a perspective view of the passenger seat arrangement of FIG. 6 with the leg assembly in an aft position.

FIGS. 6-8 illustrate an example of a passenger seat arrangement 600 in a vehicle 601 (e.g., an aircraft) having rows of passenger seats 602A-C. In this example, the passenger seat 602B has the leg assembly 100 and the passenger seats 602A and 602C have non-pivoting or standard leg assemblies. In certain cases, alternating rows of passenger seats 602 are provided with the leg assembly 100. Each passenger seat 602A-B includes a seat base 606 and at least one seat back 608. In the present example, each passenger seat 602 is capable of carrying a quantity of three passengers, and accordingly has three seat backs 608. However, it will be appreciated that in various other examples, the passenger seat 602 can be capable of carrying any desired number of passengers, such as one passenger, two passengers, three passengers, four passengers, or any other desired number of passengers. In these examples, the passenger seat 602 can likewise have any desired number of corresponding seat backs 608. In certain examples, the In various examples, the seat base 606 includes the base frame tube (not shown) coupled to the leg assembly 100.

FIG. 6 illustrates the passenger seat 602B with the leg assembly 100 in the base position 114 of FIG. 4. As illustrated in FIG. 6, when the leg assembly 100 is in the base position 114, the passenger seat 602B has a base living space 604B. Similarly, the passenger seat 602A has a base living space 604A (which may or may not be the same as the base living space 604B). In one non-limiting example, the base living space 604B is about 32 inches; however, in other examples, the base living space 604B may be greater than 32 inches or less than 32 inches.

Traditionally, to change the living space of a passenger seat, the entire passenger seat (leg assembly, seat base, seat back, etc.) is physically moved forward or aft along the surface on which the passenger seat is mounted. Such changes require re-engineering of the seats and recertification because the passenger seats are physically disconnected from the surface, moved, and then reconnected, and such connections must be retested for proper connections to meet relevant safety standards. As such, traditionally there is a great cost associated with changing the seats, and as such operators rarely change seat configurations.

With the leg assembly 100, the living space of the passenger seat may be changed as desired quickly and without such engineering and certification costs. As illustrated by comparing FIGS. 7 and 8 to FIG. 6, unlike traditional passenger seats, the leg assembly 100 is not disconnected from the surface or base member 102 to change the living space. Rather, the lower ends 112 of each leg 104A-B remain at a fixed position while the upper ends 110 pivot to allow for the change in living space, and as such engineering and recertification is not needed. Stated differently, the leg assembly 100 provides a number of different living spaces for a passenger seat while the base member 102 (and lower ends 112 of each leg 104A-B relative to the base member 102) is at a single, fixed position.

FIG. 7 illustrates the passenger seat 602B with the leg assembly 100 in the forward-most position 118 of FIG. 4. As illustrated in FIG. 7, when the leg assembly 100 is in the forward-most position 118 (or any other position forward of the base position), the passenger seat 602B has a reduced living space 704B that is less than the base living space 604B. In one non-limiting example, the reduced living space 704B is about 30 inches; however, in other examples, the reduced living space 704B may be various other distances less than the base living space 604B. As illustrated in FIG. 7, when the leg assembly 100 is in the forward-most position 118 (or any other position forward of the base position), the passenger seat 602A aft of the passenger seat 602B has an increased living space 704A that is greater than the base living space 604A. In some examples, the increased living space 704A is about 34 inches; however, in other examples, the increased living space 704A may be various other distances greater than the base living space 604A.

FIG. 8 illustrates the passenger seat 602B with the leg assembly 100 in the aft-most position 120 of FIG. 4. As illustrated in FIG. 8, when the leg assembly 100 is in the aft-most position 120 (or any other position aft of the base position), the passenger seat 602B has an increased living space 804B that is greater than the base living space 604B. In some examples, the increased living space 804B may be the same as the increased living space 704A, although it need not be. In certain examples, when the leg assembly 100 is in the aft-most position 120 (or any other position aft of the base position), the passenger seat 602A has a decreased living space 804A. In some cases, the decreased living space 804A is the same as the decreased living space 704B, although it need not be.

Figure 9:
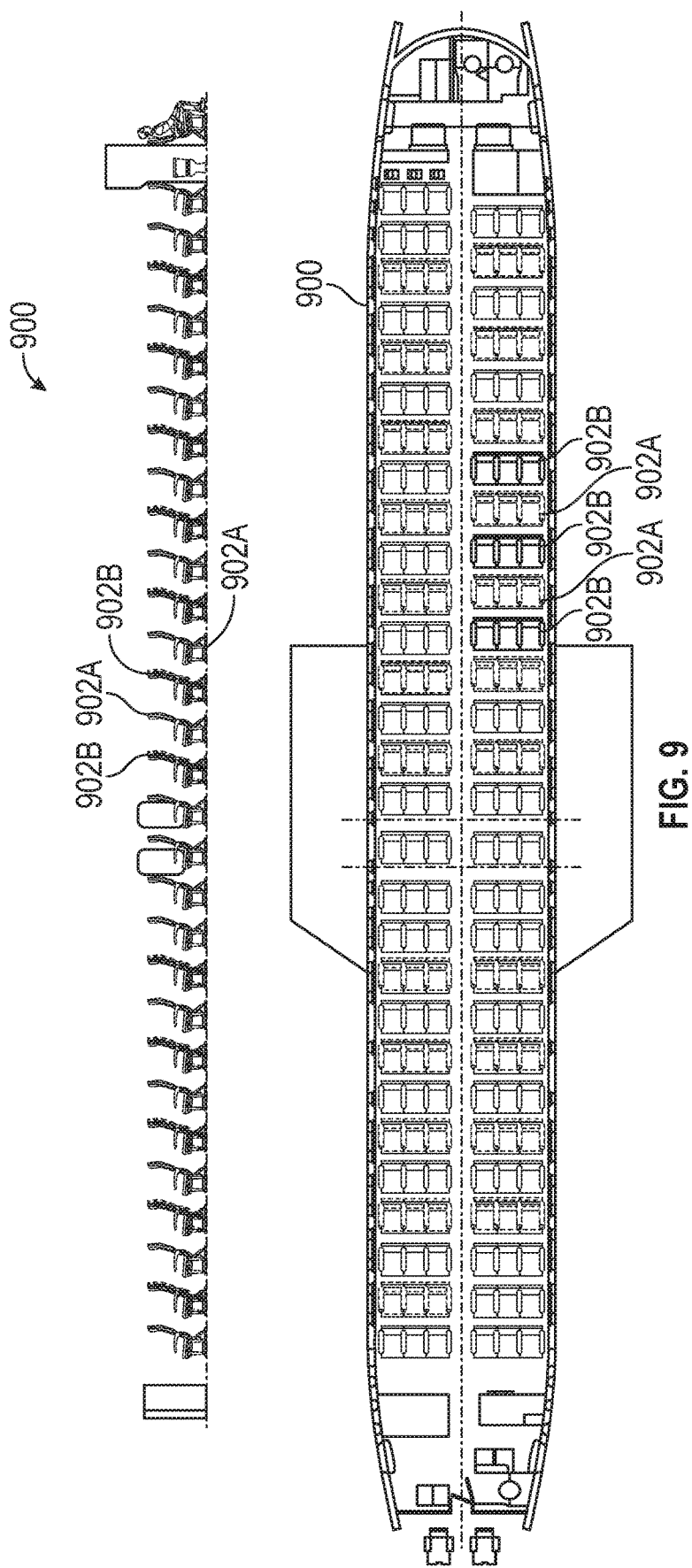
FIG. 9 illustrates a passenger seat arrangement in an aircraft where some of the passenger seats include the leg assembly of FIG. 1.

FIG. 9 illustrates an aircraft 900 having rows of passenger seats 902. As illustrated in FIG. 9, a row of passenger seats 902A having the leg assembly 100 from another row of passenger seats 902A by at least one row of passenger seats 902B that does not include the leg assembly 100.

FIGS. 10-14 illustrate a non-limiting example of a passenger seat arrangement 1000 with passenger seats 1002 each having the leg assembly 100 in various positions relative to the base position. It would be understood that various other combinations of seats in forward, aft, or base positions may be provided in a vehicle as desired.

In FIG. 10, each passenger seat 1002A-E is in the base position. Each passenger seat 1002A-E has a base living space 1004A-E as illustrated in FIG. 10.

FIG. 11 illustrates the arrangement 1000 with the passenger seats 1002A, 10020, and 1002E in the base position and passenger seats 1002B and 1002D in the aft-most position. In this configuration, the passenger seats 1002B and 1002D have increased living spaces 1104B and 1104D, respectively, which are greater than the base living spaces 1004B and 1004D, respectively. The passenger seats 1002C and 1002E have decreased living spaces 1104C and 1104E, respectively, which are less than the base living spaces 1004C and 1004E, respectively.

Figure 12:
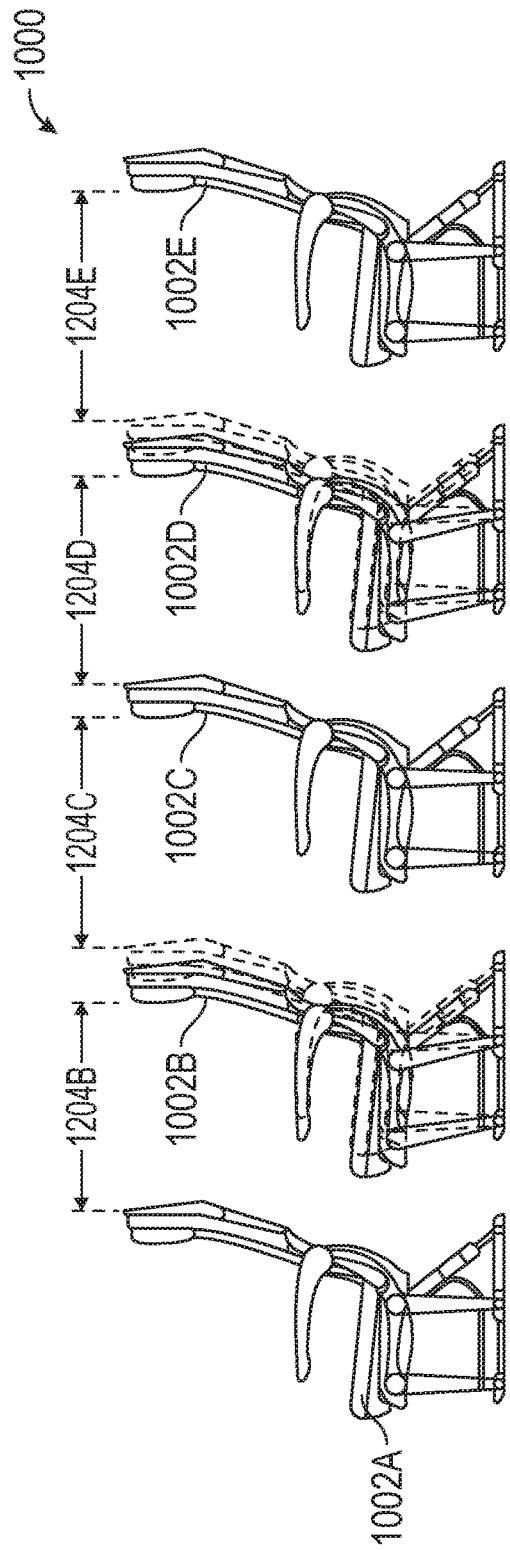
FIG. 12 is a side view of the passenger seat arrangement of FIG. 10 with the leg assemblies in another preset position.

FIG. 12 illustrates the arrangement 1000 with the passenger seats 1002A, 1002C, and 1002E in the base position and passenger seats 1002B and 1002D in the forward-most position. In this configuration, the passenger seats 1002B and 1002D have decreased living spaces 1204B and 1204D, respectively, which are less than the base living spaces 1004B and 1004D, respectively. The passenger seats 1002C and 1002E have increased living spaces 12040 and 1204E, respectively, which are greater than the base living spaces 1004C and 1004E, respectively.

Figure 13:
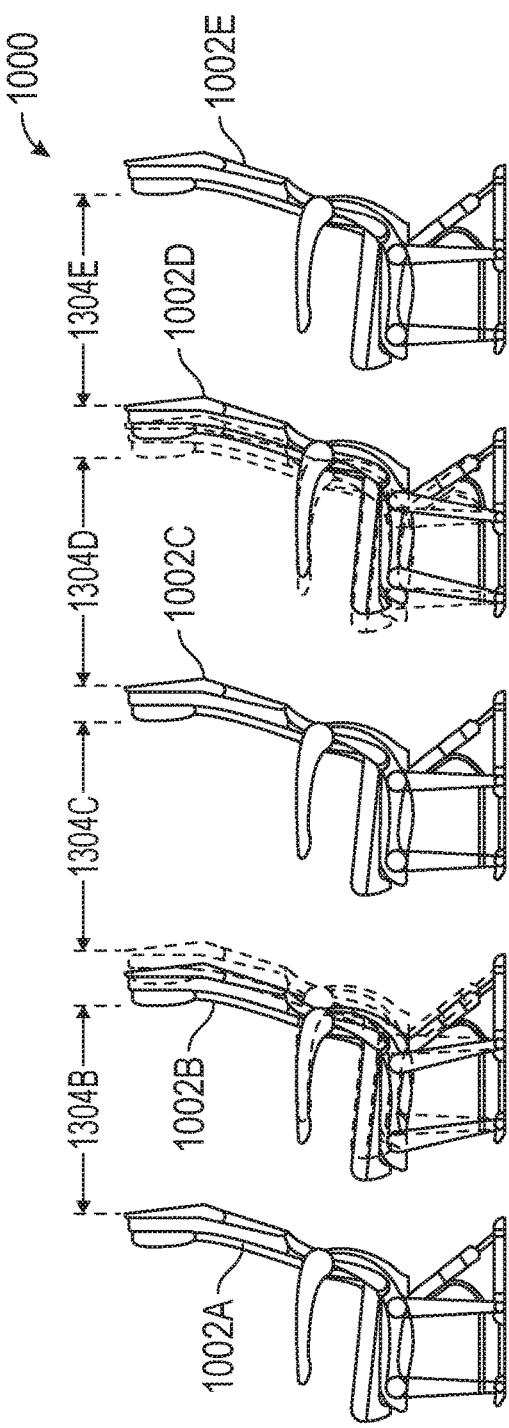
FIG. 13 is a side view of the passenger seat arrangement of FIG. 10 with the leg assemblies in another preset position.

FIG. 13 illustrates the arrangement 1000 with the passenger seats 1002A, 1002C, and 1002E in the base position, passenger seat 1002B in the forward-most position, and passenger seat 1002D in the aft-most position. In this configuration, the passenger seats 1002C and 1002D have increased living spaces 1304C and 1304D, respectively, which are greater than the base living spaces 1004C and 1004D, respectively. The passenger seats 1002B and 1002E have decreased living spaces 1304B and 1304E, respectively, which are less than the base living spaces 1004B and 1004E, respectively.

Figure 14:
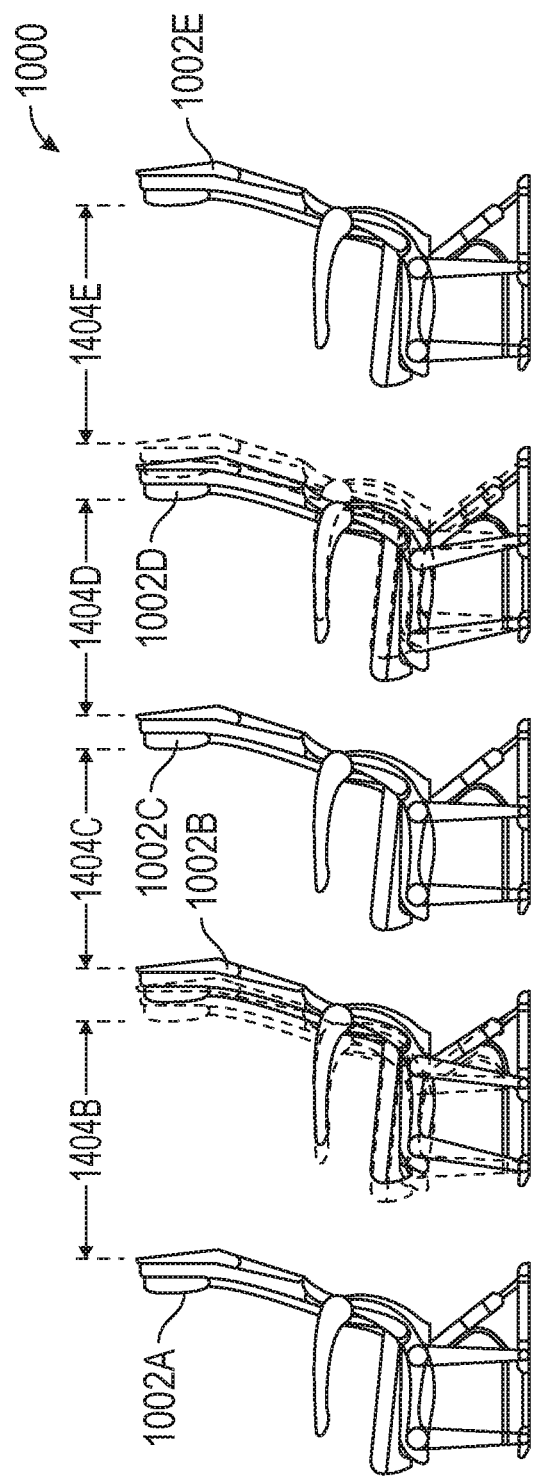
FIG. 14 is a side view of the passenger seat arrangement of FIG. 10 with the leg assemblies in another preset position.

FIG. 14 illustrates the arrangement 1000 with the passenger seats 1002A, 1002C, and 1002E in the base position, passenger seat 1002B in the aft-most position, and passenger seat 1002D in the forward-most position. In this configuration, the passenger seats 1002E and 1002E have increased living spaces 1404B and 1404E, respectively, which are greater than the base living spaces 1004B and 1004E, respectively. The passenger seats 1002C and 1002D have decreased living spaces 1304C and 1304D, respectively, which are less than the base living spaces 1004C and 1004D, respectively. Various other arrangements of passenger seats may be provided as desired.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A leg assembly for a passenger seat comprising: a base member; a leg comprising an upper end and a lower end, wherein the upper end of the leg comprises an aperture configured to receive a base frame tube, and wherein the lower end is pivotally connected to the base member such that the leg is pivotable forward and aft from a base position; and an adjuster configured to pivotally position the leg relative to the base member.

EC 2. The leg assembly of any of the preceding or subsequent example combinations, wherein the base position is a vertical position, and the leg is pivotable forward and aft from greater than 0° to about 15° from the base position.

EC 3. The leg assembly of any of the preceding or subsequent example combinations, wherein the leg is an aft leg and the adjuster is connected to the base member and the aft leg, and wherein the leg assembly further comprises; a forward leg comprising an upper end and a lower end, wherein the forward leg is pivotally connected to the base member such that the leg is pivotable forward and aft from a base position.

EC 4. The leg assembly of any of the preceding or subsequent example combinations, wherein the forward leg is indirectly connected to the adjuster such that the adjuster is configured to pivotally position the forward leg and the aft leg relative to the base member.

EC 5. The leg assembly of any of the preceding or subsequent example combinations, wherein the base member is configured to secure the leg assembly to a floor of a vehicle.

EC 6. The leg assembly of any of the preceding or subsequent example combinations, wherein the adjuster is a manually adjustable, and wherein the adjuster is configured to pivotally position the leg between preset positions.

EC 7. The leg assembly of any of the preceding or subsequent example combinations, wherein the adjuster is configured to pivotally position the leg between five preset positions.

EC 8. The leg assembly of any of the preceding or subsequent example combinations, wherein the adjuster comprises: a first threaded rod comprising a clockwise thread and a first alignment hole; a second threaded rod comprising a counter-clockwise thread and a second alignment hole; a sleeve rotatably positioned on the first threaded rod and the second threaded rod and comprising a sleeve alignment holes; and a locking washer positioned on the first threaded rod or the second threaded rod, wherein a distance between an end of the first threaded rod and an end of the second threaded rod is adjustable through rotation of the sleeve, wherein the sleeve alignment hole is aligned with the first alignment hole or the second alignment hole in a preset position, and wherein the locking washer is configured to maintain a position of the sleeve relative to the first threaded rod and the second threaded rod in the preset position.

EC 9. The leg assembly of any of the preceding or subsequent example combinations, wherein the adjuster is automatically adjustable, and wherein the adjuster is configured to pivotally position the leg between preset positions.

EC 10. The leg assembly of any of the preceding or subsequent example combinations, wherein the adjuster is configured to pivotally position the leg between five preset positions.

EC 11. The leg assembly of any of the preceding or subsequent example combinations, wherein the adjuster is a load-limiting strut.

EC 12. The leg assembly of any of the preceding or subsequent example combinations, wherein the upper end of the leg further comprises a stopping slot comprising a forward end and an aft end.

EC 13. The leg assembly of any of the preceding or subsequent example combinations, wherein the stopping slot extends transversely to the aperture.

EC 14. The leg assembly of any of the preceding or subsequent example combinations, further comprising a bearing rotatably positioned within the aperture, wherein the bearing comprises an inner surface configured to interface with the base frame tube and an outer surface interfaced with an aperture surface of the aperture such that the leg assembly is rotatable relative to the bearing.

EC 15. The leg assembly of any of the preceding or subsequent example combinations, wherein the bearing further comprises: a stopping extension positioned within the stopping slot; and a fastener configured to secure the base frame tube to the bearing, wherein the stopping extension comprises a forward end and an aft end, wherein the forward end of the stopping extension is configured to interface with the forward end of the stopping slot in an aft-most position of the leg, and wherein the aft end of the stopping extension is configured to interface with the aft end of the stopping slot in a forward-most position of the leg.

EC 16. The leg assembly of any of the preceding or subsequent example combinations, wherein the aft end of the stopping extension is spaced apart from the aft end of the stopping slot when the leg is in the aft-most position, and wherein the forward end of the stopping extension is spaced apart from the forward end of the stopping slot when the leg is in the forward-most position.

EC 17. The leg assembly of any of the preceding or subsequent example combinations, wherein the fastener extends transversely through the aperture.

EC 18. The leg assembly of any of the preceding or subsequent example combinations, wherein the faster is connected to the forward end and the aft end of the stopping extension.

EC 19. A passenger seat comprising the leg assembly of any of the preceding or subsequent example combinations.

EC 20. The passenger seat of any of the preceding or subsequent example combinations, further comprising a seat base comprising the base frame tube and a backrest.

EC 21. A passenger seat comprising: a seat base; and a leg assembly supporting the seat base and comprising: a base member; a leg comprising an upper end and a lower end, wherein the lower end is pivotally connected to the base member such that the leg is pivotable forward and aft from a base position; and an adjuster configured to pivotally position the leg relative to the base member.

EC 22. The passenger seat of any of the preceding or subsequent example combinations, wherein the leg assembly is configured to adjust a living space of the passenger seat by pivotally positioning the leg relative to the base member.

EC 23. The passenger seat of any of the preceding or subsequent example combinations, wherein the living space is adjustable such that the living space is increased up to two inches or decreased up to two inches from a predetermined living space.

EC 24. The passenger seat of any of the preceding or subsequent example combinations, further comprising a backrest connected to the seat base.

EC 25. The passenger seat of any of the preceding or subsequent example combinations, wherein the base position is a vertical position, and wherein the leg is pivotable forward and aft from greater than 0° to about 15° from the base position.

EC 26. The passenger seat of any of the preceding or subsequent example combinations, wherein the wherein the leg is an aft leg and the adjuster is connected to the base member and the aft leg, and wherein the leg assembly further comprises: a forward leg comprising an upper end and a lower end, wherein the forward leg is pivotally connected to the base member such that the leg is pivotable forward and aft from a base position.

EC 27. The passenger seat of any of the preceding or subsequent example combinations, wherein the forward leg is indirectly connected to the adjuster through the seat base such that the adjuster is configured to pivotally position the forward leg and the aft leg relative to the base member.

EC 28. The passenger seat of any of the preceding or subsequent example combinations, wherein the base member is configured to secure the leg assembly to a floor of a vehicle.

EC 29. The passenger seat of any of the preceding or subsequent example combinations, wherein the adjuster is a manually adjustable, and wherein the adjuster is configured to pivotally position the leg between preset positions.

EC 30. The passenger seat of any of the preceding or subsequent example combinations, wherein the adjuster is automatically adjustable, and wherein the adjuster is configured to pivotally position the leg between preset positions.

EC 31. The passenger seat of any of the preceding or subsequent example combinations, wherein the adjuster is a load-limiting strut.

EC 32. The passenger seat of any of the preceding or subsequent example combinations, wherein the upper end of the leg further comprises: an aperture; and a stopping slot comprising a forward end and an aft end, wherein the stopping slot extends transversely to the aperture, and wherein a base frame tube of the seat base is positioned within the aperture.

EC 33. The passenger seat of any of the preceding or subsequent example combinations, further comprising a bearing rotatably positioned within the aperture, wherein the bearing comprises an inner surface interfaced with the base frame tube and an outer surface interfaced with an aperture surface of the aperture such that the leg assembly is rotatable relative to the bearing.

EC 34. The passenger seat of any of the preceding or subsequent example combinations, wherein the bearing further comprises: a stopping extension positioned within the stopping slot; and a fastener configured to secure the base frame tube to the bearing, wherein the stopping extension comprises a forward end and an aft end, wherein the forward end of the stopping extension is configured to interface with the forward end of the stopping slot in an aft-most position of the leg, wherein the aft end of the stopping extension is configured to interface with the aft end of the stopping slot in a forward-most position of the leg, wherein the fastener extends transversely through the aperture, and wherein the faster is connected to the forward end and the aft end of the stopping extension.

EC 35. A method of controlling a passenger seat arrangement comprising: determining a desired living space of a passenger seat of the passenger seat arrangement; determining an actual living space of the passenger seat; and controlling the passenger seat such that the actual living space is the desired living space, wherein controlling the passenger seat comprises controlling an adjuster of a leg assembly and pivoting a leg of the leg assembly of the passenger seat relative to a base member of the leg assembly.

EC 36. The method of any of the preceding or subsequent example combinations, wherein controlling the passenger seat comprises pivoting the leg of the leg assembly forward.

EC 37. The method of any of the preceding or subsequent example combinations, wherein controlling the passenger seat comprises pivoting the leg of the leg assembly aft.

EC 38. The method of any of the preceding or subsequent example combinations, wherein controlling the passenger seat comprises pivoting the leg of the leg assembly relative to a base position of the leg.

EC 39. The method of any of the preceding or subsequent example combinations, wherein the base position is vertical, and wherein controlling the passenger seat comprises pivoting the leg of the leg assembly such that the actual living space is changed up to a predetermined amount in the forward direction or the aft direction from relative to the base position.

EC 40. The method of any of the preceding or subsequent example combinations, wherein the predetermined amount is two inches.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A leg assembly for a passenger seat comprising:
   a base member;
   a leg comprising an upper end and a lower end, wherein the upper end of the leg comprises an aperture configured to receive a base frame tube, and wherein the lower end is pivotally connected to the base member such that the leg is pivotable forward and aft from a base position; and
   an adjuster configured to pivotally position the leg relative to the base member, wherein the adjuster is a manually adjustable, and wherein the adjuster is configured to pivotally position the leg between preset positions,
   wherein the adjuster comprises:
     a first threaded rod comprising a clockwise thread and a first alignment hole;
     a second threaded rod comprising a counter-clockwise thread and a second alignment hole;
     a sleeve rotatably positioned on the first threaded rod and the second threaded rod and comprising a sleeve alignment holes; and
   a locking washer positioned on the first threaded rod or the second threaded rod,
   wherein a distance between an end of the first threaded rod and an end of the second threaded rod is adjustable through rotation of the sleeve,
   wherein the sleeve alignment hole is aligned with the first alignment hole or the second alignment hole in a preset position, and wherein the locking washer is configured to maintain a position of the sleeve relative to the first threaded rod and the second threaded rod in the preset position.

2. The leg assembly of claim 1, wherein the base position is a vertical position, and the leg is pivotable forward and aft from greater than 0° to about 15° from the base position.

3. The leg assembly of claim 1, wherein the leg is an aft leg and the adjuster is connected to the base member and the aft leg, and wherein the leg assembly further comprises:
a forward leg comprising an upper end and a lower end, wherein the forward leg is pivotally connected to the base member such that the leg is pivotable forward and aft from a base position.

4. The leg assembly of claim 1, wherein the adjuster is automatically adjustable, and wherein the adjuster is configured to pivotally position the leg between preset positions.

5. The leg assembly of claim 1, wherein the upper end of the leg further comprises a stopping slot comprising a forward end and an aft end, and wherein the stopping slot extends transversely to the aperture.

6. The leg assembly of claim 5, further comprising a bearing rotatably positioned within the aperture, wherein the bearing comprises:
an inner surface configured to interface with the base frame tube;
an outer surface interfaced with an aperture surface of the aperture such that the leg assembly is rotatable relative to the bearing;
a stopping extension positioned within the stopping slot; and
a fastener configured to secure the base frame tube to the bearing,
wherein the stopping extension comprises a forward end and an aft end,
wherein the forward end of the stopping extension is configured to interface with the forward end of the stopping slot in a forward-most position of the leg,
wherein the aft end of the stopping extension is configured to interface with the aft end of the stopping slot in an aft-most position of the leg, and
wherein the fastener extends transversely through the aperture and is connected to the forward end and the aft end of the stopping extension.

7. A passenger seat comprising the leg assembly of claim 1.

8. The passenger seat of claim 7, further comprising a backrest and a seat base, wherein the seat base comprises the base frame tube.

9. A passenger seat comprising:
a seat base; and
a leg assembly supporting the seat base and comprising:
a base member;
a leg comprising an upper end and a lower end, wherein the lower end is pivotally connected to the base member such that the leg is pivotable forward and aft from a base position; and
an adjuster configured to pivotally position the leg relative to the base member, wherein the leg assembly is configured to adjust a living space of the passenger seat by pivotally positioning the leg relative to the base member,
wherein the upper end of the leg further comprises:
an aperture; and
a stopping slot comprising a forward end and an aft end,
wherein the stopping slot extends transversely to the aperture, and
wherein a base frame tube of the seat base is positioned within the aperture.

10. The passenger seat of claim 9, wherein the base position is a vertical position, and wherein the leg is pivotable forward and aft from greater than 0° to about 15° from the base position.

11. The passenger seat of claim 9, wherein the leg is an aft leg and the adjuster is connected to the base member and the aft leg, and wherein the leg assembly further comprises:
a forward leg comprising an upper end and a lower end, wherein the forward leg is pivotally connected to the base member such that the leg is pivotable forward and aft from a base position.

12. The passenger seat of claim 9, further comprising a bearing rotatably positioned within the aperture, wherein the bearing comprises:
an inner surface interfaced with the base frame tube;
an outer surface interfaced with an aperture surface of the aperture such that the leg assembly is rotatable relative to the bearing;
a stopping extension positioned within the stopping slot; and
a fastener configured to secure the base frame tube to the bearing,
wherein the stopping extension comprises a forward end and an aft end,
wherein the forward end of the stopping extension is configured to interface with the forward end of the stopping slot in a forward-most position of the leg,
wherein the aft end of the stopping extension is configured to interface with the aft end of the stopping slot in an aft-most position of the leg,
wherein the fastener extends transversely through the aperture, and
wherein the fastener is connected to the forward end and the aft end of the stopping extension.

13. A method of controlling the passenger seat of claim 7, the method comprising:
determining a desired living space of the passenger seat;
determining an actual living space of the passenger seat; and
controlling the passenger seat such that the actual living space is the desired living space, wherein controlling the passenger seat comprises controlling the adjuster of the leg assembly and pivoting the leg of the leg assembly of the passenger seat relative to the base member of the leg assembly.

14. The method of claim 13, wherein controlling the passenger seat comprises pivoting the leg of the leg assembly in a forward direction.

15. The method of claim 13, wherein controlling the passenger seat comprises pivoting the leg of the leg assembly in and aft direction.

16. The method of claim 13, wherein controlling the passenger seat comprises pivoting the leg of the leg assembly relative to a base position of the leg.

17. The method of claim 16, wherein the base position is vertical, and wherein controlling the passenger seat comprises pivoting the leg of the leg assembly such that the actual living space is changed up to a predetermined amount in a forward direction or an aft direction from relative to the base position.

18. A leg assembly for a passenger seat comprising:
a base member;

a leg comprising an upper end and a lower end, wherein the upper end of the leg comprises an aperture configured to receive a base frame tube, and wherein the lower end is pivotally connected to the base member such that the leg is pivotable forward and aft from a base position; and an adjuster configured to pivotally position the leg relative to the base member, wherein the upper end of the leg further comprises a stopping slot comprising a forward end and an aft end, and wherein the stopping slot extends transversely to the aperture.

\* \* \* \* \*